United States Patent
Knowles et al.

(10) Patent No.: US 9,880,044 B2
(45) Date of Patent: Jan. 30, 2018

(54) ACOUSTIC ARRAY SENSOR

(71) Applicant: STREET SMART SENSORS LLC, Austin, TX (US)

(72) Inventors: Terence J. Knowles, Lake Barrington, IL (US); Charles F. Bremigan, III, Jarrell, TX (US)

(73) Assignee: STREET SMART SENSORS LLC, Austin, TX (US)

(*) Notice: Subject to any disclaimer, the term of this patent is extended or adjusted under 35 U.S.C. 154(b) by 550 days.

(21) Appl. No.: 13/677,086

(22) Filed: Nov. 14, 2012

(65) Prior Publication Data

US 2013/0118253 A1    May 16, 2013

Related U.S. Application Data

(60) Provisional application No. 61/559,188, filed on Nov. 14, 2011.

(51) Int. Cl.
G01F 23/296 (2006.01)

(52) U.S. Cl.
CPC ........ *G01F 23/296* (2013.01); *G01F 23/2962* (2013.01); *G01F 23/2965* (2013.01)

(58) Field of Classification Search
CPC ........................ G01F 23/296; G01F 23/2968
USPC ................ 73/584–684, 290 R–190 V
See application file for complete search history.

(56) References Cited

U.S. PATENT DOCUMENTS

| 4,890,490 A | 1/1990 | Telford |
| 4,893,496 A | 1/1990 | Bau et al. |
| 5,072,427 A | 12/1991 | Knowles |
| 5,162,618 A * | 11/1992 | Knowles ............... 178/18.04 |
| 5,177,327 A * | 1/1993 | Knowles ............... 178/18.04 |
| 5,243,148 A * | 9/1993 | Knowles ............... 178/18.04 |
| 5,260,521 A * | 11/1993 | Knowles ............... 178/18.04 |
| 5,329,070 A * | 7/1994 | Knowles ............... 178/18.04 |
| 5,573,077 A * | 11/1996 | Knowles ............... 178/18.04 |
| 5,591,945 A * | 1/1997 | Kent ....................... 178/18.04 |
| 5,648,643 A * | 7/1997 | Knowles et al. ........ 178/18.04 |
| 5,739,479 A * | 4/1998 | Davis-Cannon et al. . 178/18.04 |
| 6,091,406 A * | 7/2000 | Kambara et al. ............ 345/177 |
| 6,581,459 B1 | 6/2003 | Lichtenfels |
| 7,545,365 B2 * | 6/2009 | Kent et al. ................... 345/173 |

(Continued)

FOREIGN PATENT DOCUMENTS

| WO | 2005103873 A2 | 11/2005 |
| WO | 2007089412 A2 | 8/2007 |

OTHER PUBLICATIONS

International Search Report and the Written Opinion of the International Searching Authority issued on Feb. 7, 2013 in connection with PCT/US2012/065097.

(Continued)

*Primary Examiner* — Peter Macchiarolo
*Assistant Examiner* — Alexander Mercado
(74) *Attorney, Agent, or Firm* — Levenfeld Pearlstein, LLC

(57) ABSTRACT

A level sensor includes a substrate having at least one reflective side surface, at least one wave generator on one end of the substrate configured to transmit a wave down the surface of the substrate and a plurality of reflective echelons mounted on the substrate such that each echelon is at an angle relative to reflective side surface. The reflective echelons are configured to convert a wave of a first mode in to a wave of a second mode.

29 Claims, 14 Drawing Sheets

(56) References Cited

U.S. PATENT DOCUMENTS

| | | | |
|---|---|---|---|
| 7,764,276 B2* | 7/2010 | Schermerhorn | 345/177 |
| 8,325,159 B2* | 12/2012 | Kent et al. | 345/177 |
| 2009/0236938 A1 | 9/2009 | Bromfield | |

OTHER PUBLICATIONS

Lynnworth, Physical Acoustics, Academic Press, 1979, pp. 460-463.

* cited by examiner

ACOUSTIC ARRAY SENSOR

BACKGROUND

Conventional liquid level sensors for fixed, discrete and continuous level sensing are not effective to measure fluid levels in highly aerated fluids. For example, ultrasonic sensors, which determine the presence or level of a fluid by the passage of acoustic waves from a transmitting element to a receiving element (Lynnworth, Physical Acoustics, Academic Press, 1979, pgs. 460-461), do not function in highly aerated fluids due transmission losses that drastically increase with aeration. Further, sensors that determine fluid level using a buoyant element can operate in aerated fluids, but have moving parts subject to jamming and wear.

One potential solution to this aeration problem is the use of acoustic modes with significant out of plane displacements. Rayleigh surface acoustic waves, for example, suffer large propagation losses in the presence of aerated fluids on the immersed substrate surface. A problem with using Rayleigh surface waves lies with fluid remaining on non-immersed surfaces of a sensor probe causing additional propagation losses because the sensor cannot discriminate between fluid residue on the probe, and the fluid in which the probe is immersed. This can occur, for example, in highly viscous fluids at low temperatures, because the fluids are slow to drain from a recently immersed surface.

A further problem with out of plane, or longitudinal modes is related to the need to seal the probes. This is normally accomplished with compliant elastomeric polymers in the form of an O-ring. Out of plane modes are greatly absorbed by these polymer O-rings, which are tightly compressed to affect a seal over a wide temperature range, and with a possible pressure differential between the inner and outer regions. Accordingly, a need exists for a liquid level sensor capable of measuring the level of aerated liquids, without the use of moving parts, that is less susceptible to sealing losses and non-immersed fluid residue.

SUMMARY

Various embodiments of the present disclosure provide a level sensor including a substrate having at least one reflective side surface, at least one wave generator on one end of the substrate configured to transmit a wave along the surface of the substrate and a plurality of reflective echelons mounted on the substrate such that each echelon is at an angle relative to a reflective side surface, where the reflective echelons are configured to convert a wave of a first mode to a wave of a second mode.

In an embodiment, the echelons are provided at an angle of approximately 39.1 degrees relative to a reflective side surface of the sensor. The wave transmitted down the substrate is a zeroth order shear wave, which is less susceptible to sealing and fluid residue losses. The zeroth order shear wave is converted into an anti-symmetric, first order Lamb flexural wave by each echelon. Each echelon directs the converted Lamb flexural wave to a reflective side surface of the substrate and back toward the array of echelons where it is converted back to a zeroth order shear wave and directed back to the transducer. The Lamb flexural wave has substantial out of plane displacements and is absorbed by fluid immersion, whereas the shear component along the array axis is not substantially absorbed, thereby decreasing the effects of fluid residue on the non-immersed section. Moreover, the present sensor reduces the effects of spurious reflections.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1A:
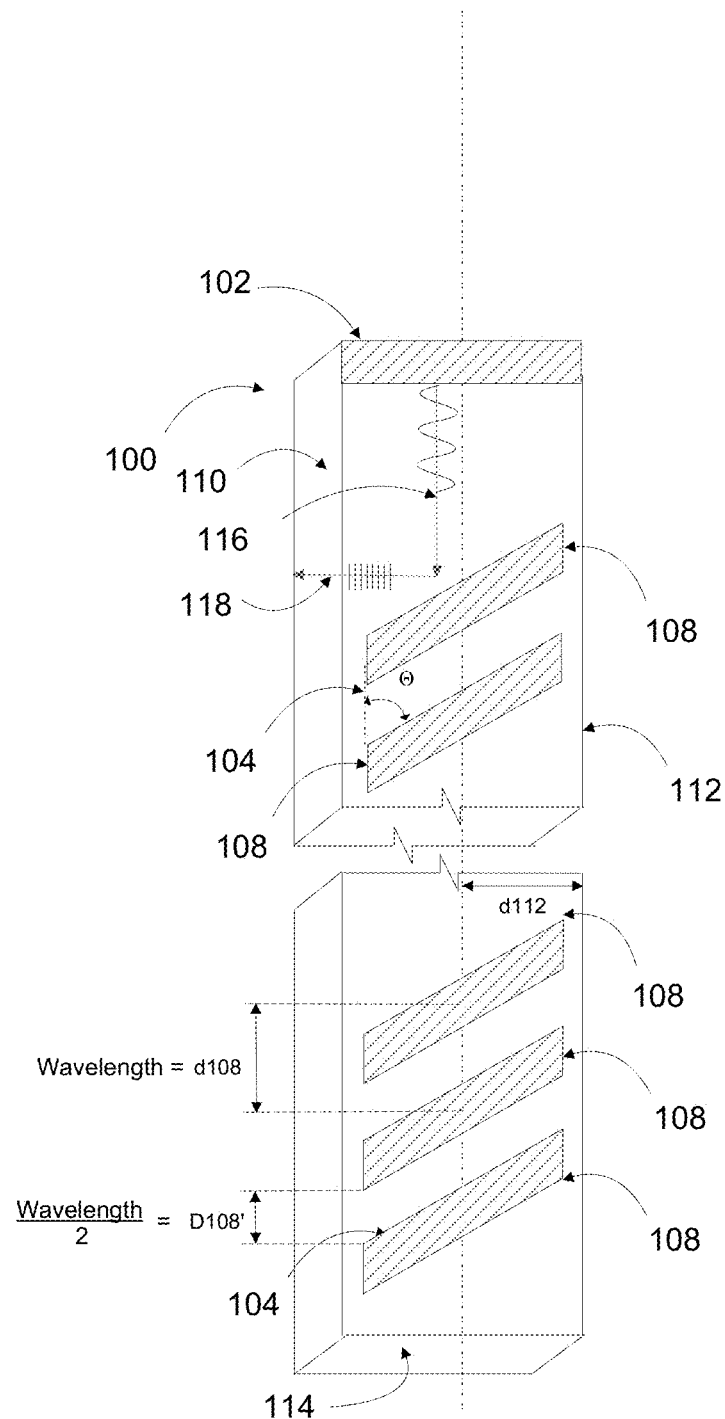
FIG. 1A illustrates an embodiment of a level sensor.

While the present disclosure is susceptible of embodiment in various forms, there is shown in the drawings, and will hereinafter be described, one or more embodiments with the understanding that the present disclosure is to be considered illustrative only and is not intended to limit the disclosure to any specific embodiment described or illustrated.

FIG. 1A illustrates a level sensor 100 that includes at least one wave transducer 102, a substrate 104, and a plurality of echelons 108 positioned on the substrate 104. The substrate 104 includes a first reflective side surface 110, a second reflective side surface 112 and a reflective end surface 114. The substrate 104 and echelons 108 can be manufactured from any material including metal, ceramic, plastic and the like. In one embodiment, the substrate 104 and echelons 108 are manufactured from stainless steel. In another embodiment, the substrate 104 and echelons 108 are manufactured from polyphenylene sulfide (PPS). The echelons 108 may also be manufactured from a material different than that of the substrate 104.

The plurality of echelons 108 are arranged in an array along the center axis $A_{104}$ of the substrate 104, with each echelon 108 being separated from adjacent echelons 108 by a first distance $d_{108}$, and from the reflective side surfaces 110, 112 and the reflective end surface 114 by a second distance $d_{112}$. The distance $d_{108}$ is the distance from the center portion of one echelon 108 to the center portion of an adjacent echelon 108. The distance $d_{108}$ may be approximately equal to the length of one wavelength of the wave produced by the wave transducer 102. The distance $d_{108'}$, which is the width of the echelon along the center axis, may be about one half of a wavelength.

The echelons 108 are formed on the substrate 104 such that each echelon 108 is positioned at an angle Θ from a line parallel to the first or second reflective side surfaces 110, 112. The transducer 102 is configured to transmit a transverse acoustic wave 116 in the plane of the substrate and along the length of the sensor. A transverse wave is a wave where the oscillations of the wave are substantially perpendicular to the direction of energy transfer, in the plane of the substrate. Each echelon 108 may direct the transverse acoustic wave 116 toward at least one of the reflective side walls 110, 112 as a flexural acoustic wave 118. A flexural acoustic wave preferably exhibits motion out of the plane of the substrate 104.

Figure 1B:
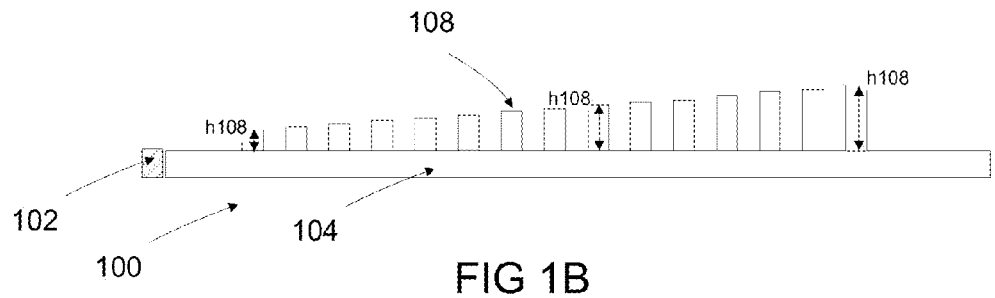
FIG. 1B is a side view of the level sensor of FIG. 1A.

FIG. 1B is a side view of an embodiment of level sensor 100. The height $h_{108}$ of each echelon 108 is based on the distance between the echelon 108 and the transducer 102, with the echelons 108 furthest from the transducer 102 being taller than the echelons 108 closer to the transducer 102, such that each echelon 108 reflects an approximately equal amount of energy per distance back to the transducer 102.

In an embodiment, the reflectivity of each echelon 108 is adjusted to provide an increasing amount of energy with time, back to the transducer 102, to reduce the effects of multiple reflection. This is defined as back end boost.

In one embodiment, the reflectivity of each echelon 108 is adjusted by varying the amount of reflective material deposited on the surface of the echelon 108. In another embodiment, the width of each echelon 108 is approximately one half of the width of the operational wavelength of the signal produced by the wave transducer 102.

Figure 1C:
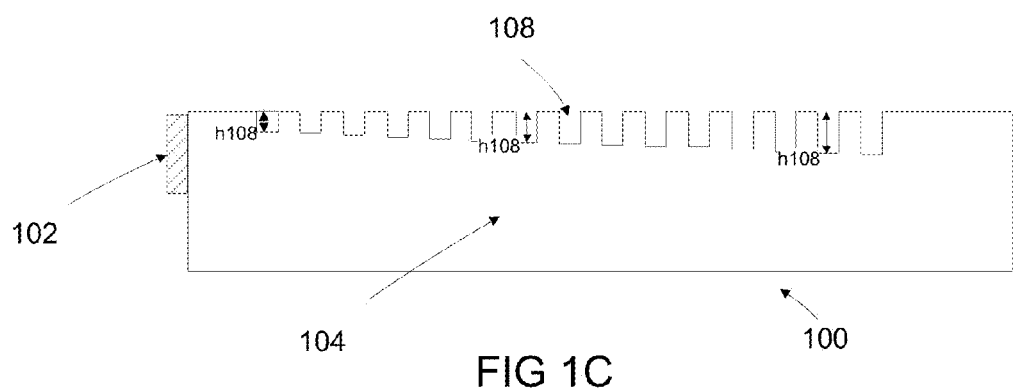
FIG. 1C is a side view of an alternate embodiment of the level sensor.

FIG. 1C illustrates a side view of a level sensor 100, with the echelons 108 formed by removing portions of the substrate 104. Consistent with this embodiment, a portion of the substrate 104 is removed from the substrate 104 to form the echelon 108, with the amount removed from the substrate to a depth $h_{108}$, increasing along the length of the substrate 104 in a direction away from the transducer 102 (e.g., the echelon 108 closest to the transducer 102 is the shallowest echelon 108).

Figure 1D:
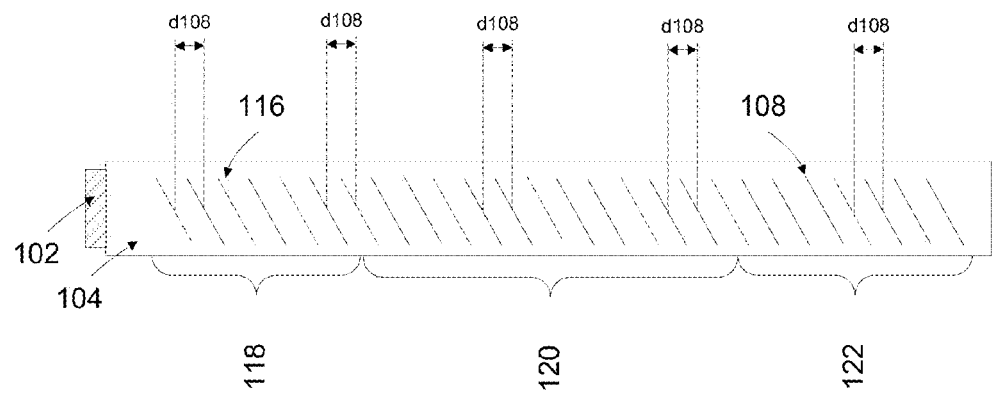
FIG. 1D is a front view of a level sensor with the reflectivity adjusted using the "finger withdrawal method.

FIG. 1D shows a front view of a level sensor 100, with the reflectivity adjusted using the "finger withdrawal method." The substrate 104 of the sensor 100 includes a plurality of echelons 108 approximately evenly spaced across the surface of the substrate 104 by the distance $d_{108}$. The "finger withdrawal method" involves adjusting the reflectivity of the sensor 100 by removing echelons 116 along the length of the substrate 104, with more echelons 108 being removed from an upper portion 118 (closest to the transducer 102) of the substrate 104 than from a middle portion 120, or a lower portion 122 (farthest from the transducer), of the substrate 104.

As an illustrative example, the reflectivity of the sensor 100 can be adjusted by removing every fourth echelon 116 from the substrate 104 in the lower portion 122 (the removed echelons 116 being represented by dashed line in FIG. 1D), every third echelon 116 in the middle portion 120, and every other echelon 116 in the upper portion 118. By removing specific echelons 108 from the substrate 104 at different positions along the substrate 104, the reflectivity of the echelon 108 array is maintained at a constant level across the length of the substrate 104, because more echelons 108 are positioned to direct the wave back to the transducer 102 as the distance from the transducer 102 increases.

Figure 2:
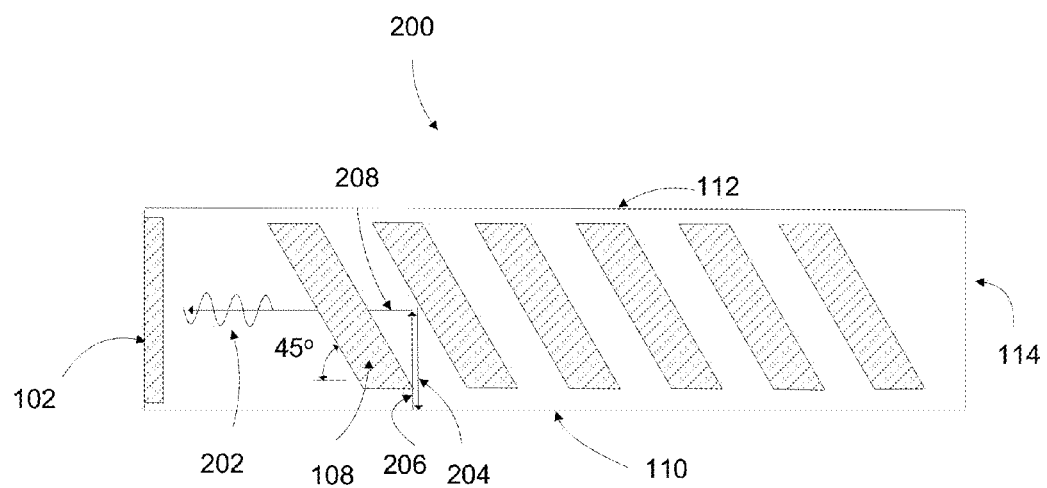
"
FIG. 2 illustrates another embodiment of a level sensor.

FIG. 2 illustrates an embodiment of a level sensor 200 having a plurality of echelons 108 positioned at approximately a 45 degree angle from a line parallel to the first reflective side surface 110. A wave transducer 102 is positioned on an end or top surface of the sensor, opposite the reflective end surface 114. The wave transducer 102 produces a wave burst 202 that is transmitted toward the array of echelons 108 down a centerline $A_{104}$ of the substrate 104. As the wave 202 contacts each echelon 108, the echelon 108 directs a portion of the wave 204 toward the first reflective side surface 110. The first reflective side surface 110 reflects the wave 206 back toward the echelon 108, and the echelon 108 directs the wave 208 from the echelon 108 back toward the transducer 102.

Figure 2A:
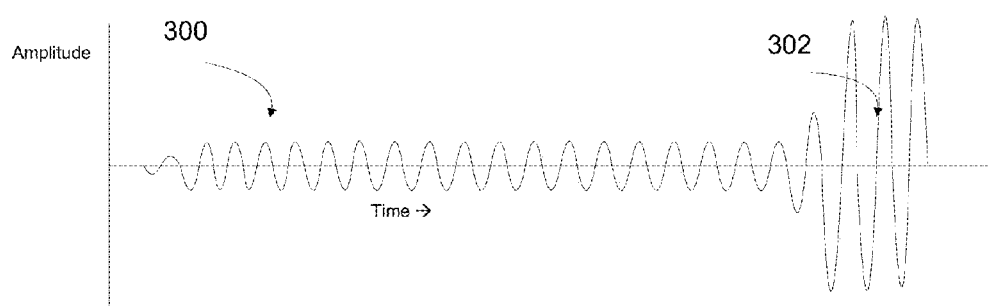
FIG. 2A illustrates a pulse train generated by the level sensor of FIG. 2 in fluid.

As the wave 208 progresses across each echelon 108, a portion of the wave 208 is directed back to the transducer 102 to create a pulse train 300 as depicted in FIG. 2A. Because of the configuration of the echelons 108, each of the waves 208 directed back from each of the echelons 108 has the same amplitude. Once the wave 202 travels the entire length of the substrate 104, the reflective end surface 114 directs the wave 202 back to the transducer 102, which is indicated in the pulse train 300 as a spike in amplitude as indicated at 302, before the termination of the pulse train 300.

Figure 3:
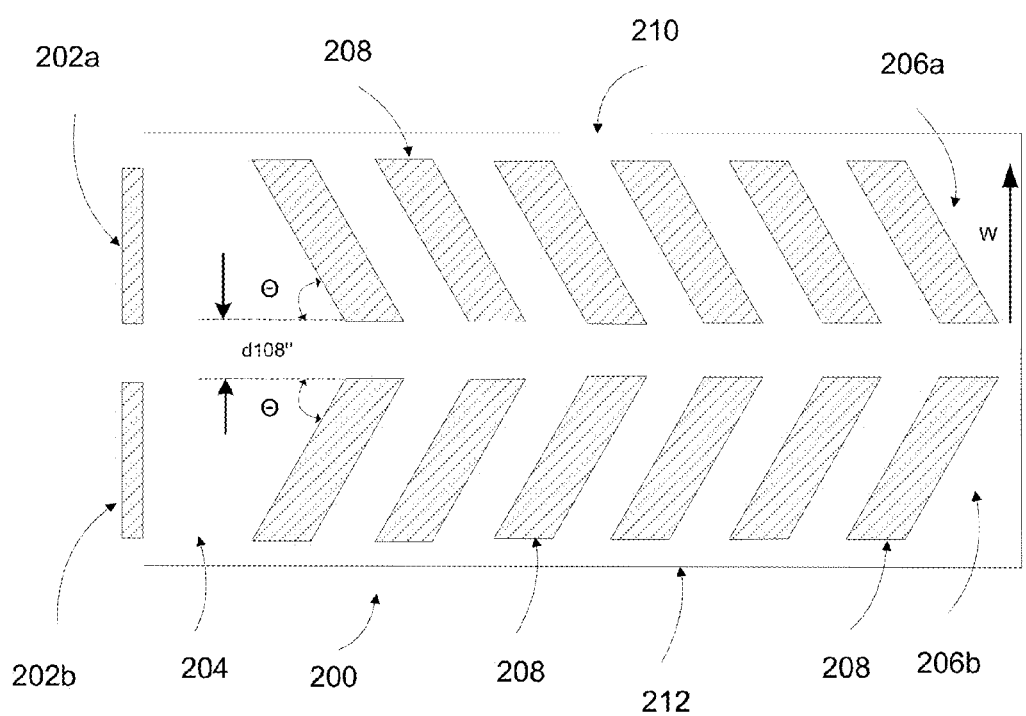
FIG. 3 illustrates yet another embodiment of the level sensor, the sensor shown in a double-array pattern.

FIG. 3 illustrates a level sensor 200 having a plurality of echelons 208 consisting of two arrays 206a,b positioned side by side and parallel with each other, with echelon angles θ of 37.2 degrees relative to a side surface of the sensor. In the double-array shown, the upper array 206a transducer 202a transmits an in-plane pulse train, and its corresponding array converts the in-plane mode to, for example, a first order antisymmetric Lamb mode with substantially out of plane wave motion. The lower array 206b, separated from the upper array 206a by distance $d_{108'}$, converts the Lamb mode back to an in-plane mode, back to its corresponding transducer 202b. As will be described below, two arrays 206a,b are preferable to a single array sensor when spurious reflections from the sides 210, 212 of the substrate 204 or sensor strip, unduly interfere with the desired response.

Figure 4A:
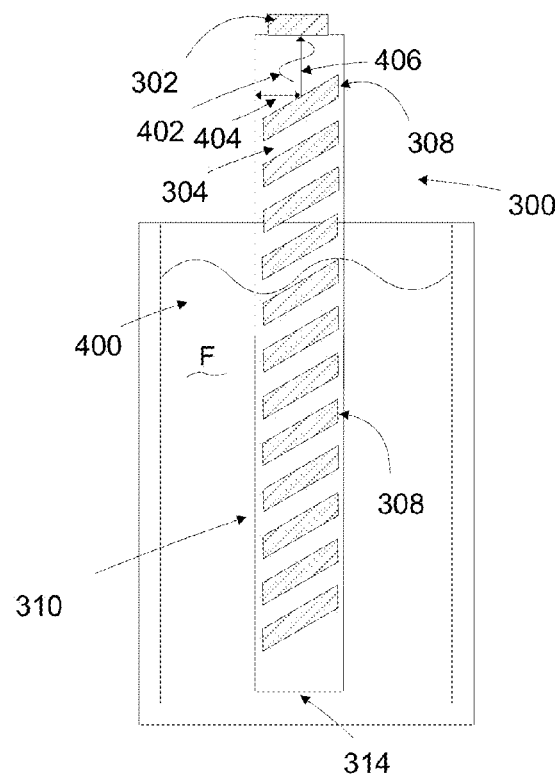
FIG. 4A shows the level sensor of FIG. 2 immersed in a fluid.

FIG. 4A illustrates a level sensor 300 immersed in a fluid F such as, but not limited to, hydraulic oil or a urea solution. The sensor 300 includes a wave transducer 302 positioned on the non-immersed end of the substrate 304. A plurality of echelons 308 are positioned above the fluid F and a plurality of echelons 308 are immersed in the fluid F.

Figure 4B:
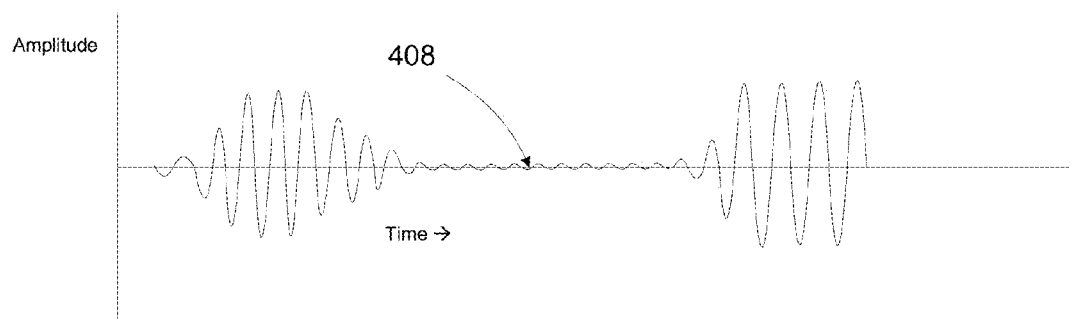
FIG. 4B illustrates a pulse train generated by the level sensor of FIG. 4A in fluid.

FIG. 4B shows a pulse train 408 generated in response to a shear wave burst sent along the sensor 300 from the transducer 302. To produce the pulse train 408, the transducer 302 generates a shear wave 402 that is sent down the length of the substrate 304 toward the fluid F. Each of the echelons 308 is positioned on the substrate 304 such that a portion of the wave 404 is directed off the surface of the echelon 308 to the first reflective side surface 310. The first reflective side surface 310 reflects the wave 404 back toward the echelon 308, and the echelon 308 directs the wave 406 back toward the transducer 302. As the shear wave 402 propagates down the length of the substrate 304, each echelon 308 directs a shear wave 406 back to the transducer 302, which collects the reflected waves 406 over time to produce the pulse train 408. The length of the pulse train 408 is linearly dependent on the length of the substrate 304 immersed in the fluid F. However, reflective array sensors with substantially in-plane wave modes do not diminish rapidly with reduced depth, hence the transition in pulse train amplitude at the fluid F surface is not well defined making the determination of fluid depth somewhat difficult to ascertain. This is illustrated in FIG. 4B which shows a gradual transition in amplitude at the fluid surface.

Figure 5A:
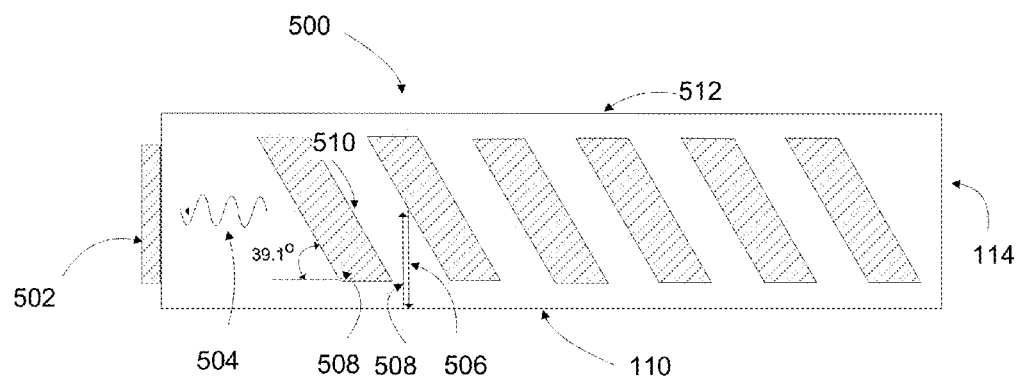
FIG. 5A illustrates a level sensor having a plurality of echelons arranged on a substrate.

FIG. 5A illustrates a level sensor 500 having a plurality of echelons 508 arranged on a substrate 504. The echelons 508 are configured to convert a zeroth order shear wave 504, generated by a shear wave transducer 502, into an anti-symmetric, first order Lamb flexural wave 506. To perform this conversion, the angle Θ, which represents the angle where a zeroth order shear wave is converted to a Lamb wave, is determined using the equation:

$$\Theta = \arctan(\text{Lamb mode Velocity}/\text{Zeroth Order Shear Wave Velocity}) \quad \text{(Eq. 1)}$$

In an embodiment, the angle Θ is approximately 45 degrees. In another embodiment, the angle Θ is approximately 39.1 degrees. In yet another embodiment, the angle Θ is approximately 37 degrees.

Figure 5B:
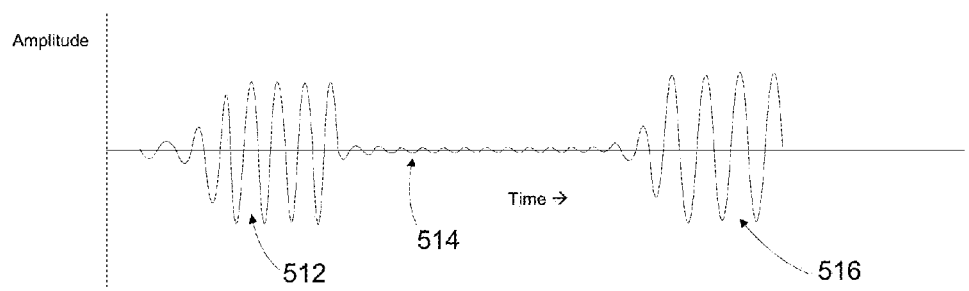
FIG. 5B shows a pulse train generated by the level sensor of FIG. 5A in fluid.

FIG. 5B shows a pulse train of an immersed in-plane to out of plane conversion array, showing a much greater amplitude reduction at the fluid surface. An abrupt amplitude transition at the fluid surface is desirable because, as will be described in more detail below, the time at which a drop in amplitude below a reference pulse train amplitude occurs, is a measure of the location of the fluid surface along the pulse train. The sharper the transition, the better the accuracy in determining the fluid surface, and thus the liquid level. The abruptness is a function of the type of mode employed, the operating frequency, the distance from the edge of the array to the reflecting edge, the width of the array, and the substrate thickness. These factors are all under the designer's control and are application dependent. The more abrupt the transition the more accurately fluid level is resolved; however, the sensor then becomes more sensitive to residue on the non-immersed part of the sensor strip. A zeroth order shear mode is the preferred mode generated by the transducer because it is non-dispersive, is the least sensitive to residue and fluid immersion, and the transducer can be mounted on the edge of the sensor strip. Sensor strips may be required to be over six feet long, and a dispersive mode, that is a mode whose wavelength depends on frequency will tend to dissipate due to dispersion, and this increases with sensor length. Edge mounting a transducer is desirable because it simplifies assembly of the sensor.

The pulse train shown in FIG. 5B is a pulse train generated by the shear wave transducer 502 and echelons 508 positioned such that the zeroth order shear wave 504 is converted into an anti-symmetric, first order Lamb flexural wave when the sensor 500 is immersed in a fluid. The first pulse train 512 has a first amplitude that continues over the non-immersed portion of the sensor 500. The pulse train drops to a second amplitude over a second portion of the pulse train, as indicated at 514, which is immersed in the fluid, and then abruptly rises again when the pulse train is reflected from the reflective end, as indicated at 516. Accordingly, the point of immersion can be determined by analyzing the pulse train to determine the position where the pulse train amplitude drops below a predefined threshold, indicating the point where the surface of the fluid meets the sensor.

In addition to converting a zeroth order shear wave into an anti-symmetric, first order Lamb shear wave, the echelons 508 may be configured to convert a shear wave of one order, or mode, into a shear wave of a second order, or mode. The order, or mode, of the waves converted by each echelon 508 is not limited, and includes all higher orders of waves. As an illustrative example, each echelon 508 may convert a first order wave into a fourth order wave that is directed toward the reflective surface 510. Each echelon 508 may also convert a higher order wave into a lower order wave. The echelons 508 may also reflect a wave toward a reflective surface 510 without performing any conversion of the wave. In addition, the echelons 508 may convert a symmetrical shear wave into an anti-symmetrical shear wave. Further, the wave generator may produce longitudinal waves opposed to shear waves.

The level sensor 500 includes a shear wave transducer 502 that generates a zeroth order shear wave burst 504 that travels along the center axis $A_{500}$ of the sensor 500. As the zeroth order shear wave 504 passes through each echelon 508, the echelon 508 converts the zeroth order shear wave 504 into an anti-symmetric, first order Lamb flexural wave 506 that is directed toward the first reflective side surface 510. The first reflective side surface 510 reflects the first order Lamb flexural wave 508 back to the echelon 508 where it is converted back to a zeroth order shear wave 510 and is directed back to the transducer 502. The phase velocity of the Lamb flexural waves 506 and 508 vary with the frequency-substrate thickness ratio and the elastic properties of the substrate 504. Accordingly, the positioning of each of the echelons 508 on the substrate 504 is determined by calculating a phase velocity of the Lamb flexural wave 508 based on an operating frequency of the Lamb flexural waves 506 and 508, the material of the substrate 504, and the thickness of the substrate 504 via the Rayleigh-Lamb equation.

The phase velocity of the zeroth order shear mode depends only on the elastic properties of the substrate, stainless steel for example, is approximately 3.04 mm per microsecond, with a bulk longitudinal mode velocity of approximately 5.68 mm per microsecond. Solving the Rayleigh-Lamb equation with these parameters allows for determining the phase velocity of the first order antisymmetric Lamb mode as a function of the frequency-thickness product. Substituting these values into Eq. 1 determines the array conversion angles in type 304 stainless steel versus the frequency-thickness product, as shown in FIG. 6.

Figure 6:
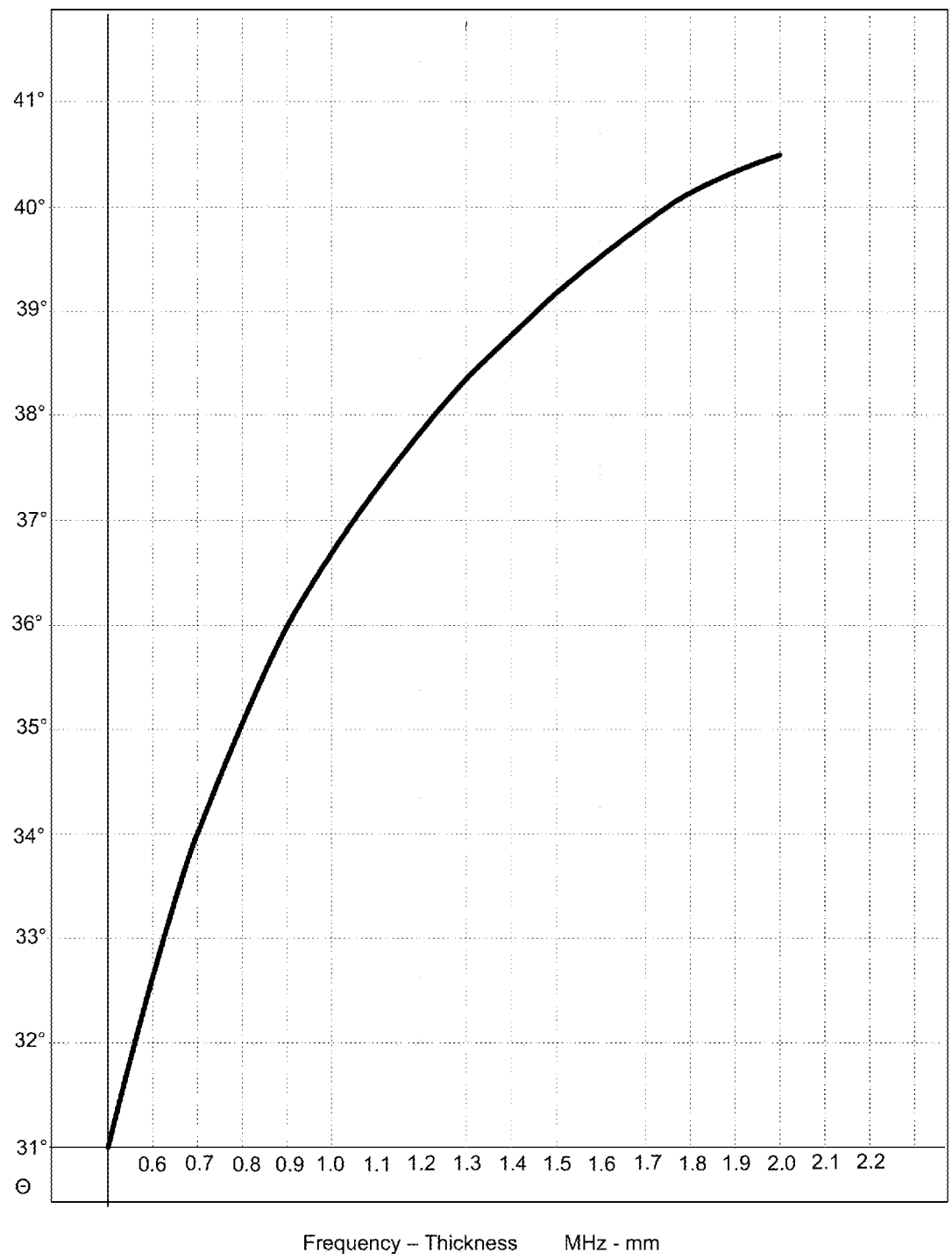
FIG. 6 is a graphical representation of the conversion angle versus the thickness-frequency product for stainless steel calculated from the Rayleigh-Lamb equation and equation Eq. 1, below.

FIG. 6 is a graphical representation of the conversion angle versus the thickness-frequency product for stainless steel calculated from the Rayleigh-Lamb equation and equation Eq. 1.

Further, the sensor 500 can be configured to perform a self-calibration function by analyzing the time that elapses between the transmission of the wave 504 and the reflection of the wave 504 back from the end surface 518. Because the distance $d_{508}$ between each echelon 508 is approximately equal, and the velocities of the wave 504 traveling in the fluid and outside the fluid can be calculated based on the pulses directed back from the immersed and non-immersed echelons 508, the total distance the wave 504 travels can be determined by analyzing the time required for the wave 504 to travel the length of the array and back to the transducer 502. This value can be compared to the known length of the sensor 500 to determine any error in the sensor 500.

The level sensor 500 can be used to continuously monitor the level of a fluid by continuously sending waves along the substrate 504 and analyzing the received pulse trains. The level sensor 500 can also be used as a level threshold detecting unit that determines if a level of a fluid has reached a predetermined threshold level. Consistent with this embodiment, the level sensor 500 is positioned at a predetermined height above a fluid. The transducer 502 transmits a wave along the sensor as previously discussed. When the amplitude of the pulse train received in response to a wave being transmitted along the substrate 504 drops below a predetermined amplitude level, the level sensor 500 transmits a signal to a control panel (see, e.g., 600 in FIG. 10) indicating that the fluid is in contact with the level sensor 500. Because the level sensor 500 is monitoring for the presence of a fluid at a predefined level, the length of the level sensor 500 can be smaller than the total depth of the fluid monitored.

Figure 7A:
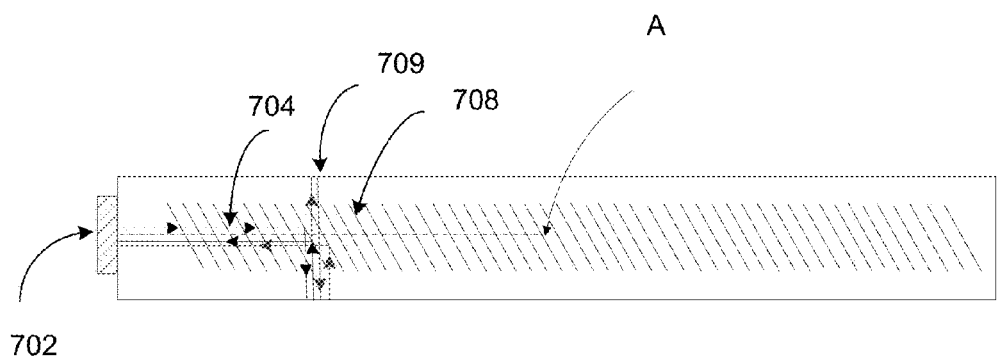
FIG. 7A shows spurious signals within the sensor emanating from downstream regions of the array.
Figure 7B:
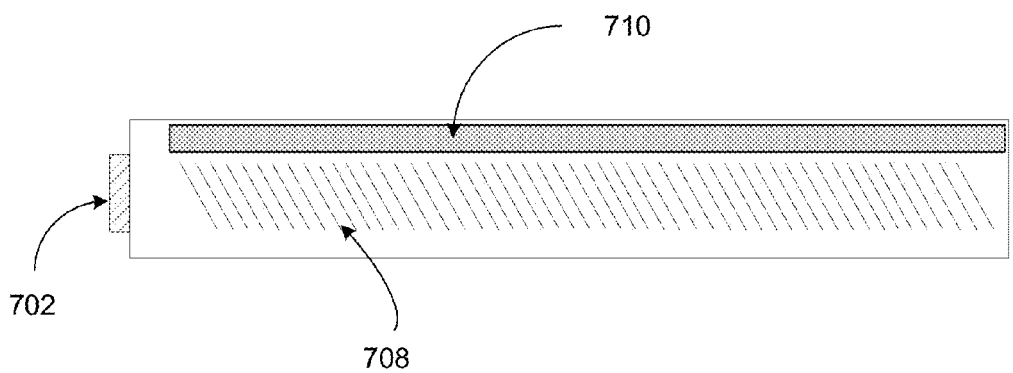
FIG. 7B illustrates a sensor in which Lamb mode absorbing materials are provide along the sides of the substrate.
Figure 7C:
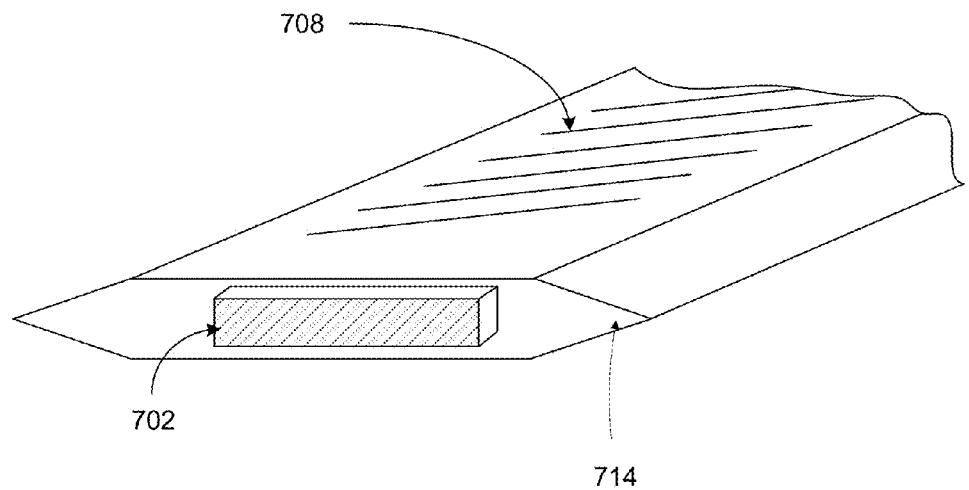
FIG. 7C is an illustration of a sensor substrate having a knife-edge configuration.
Figure 7D:
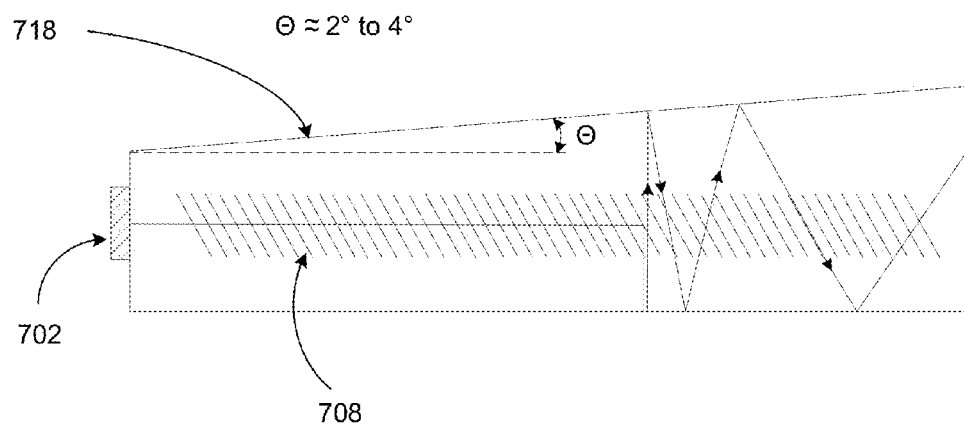
FIG. 7D is an illustration of a sensor substrate having a non-parallel-edge configuration.
Figure 8:
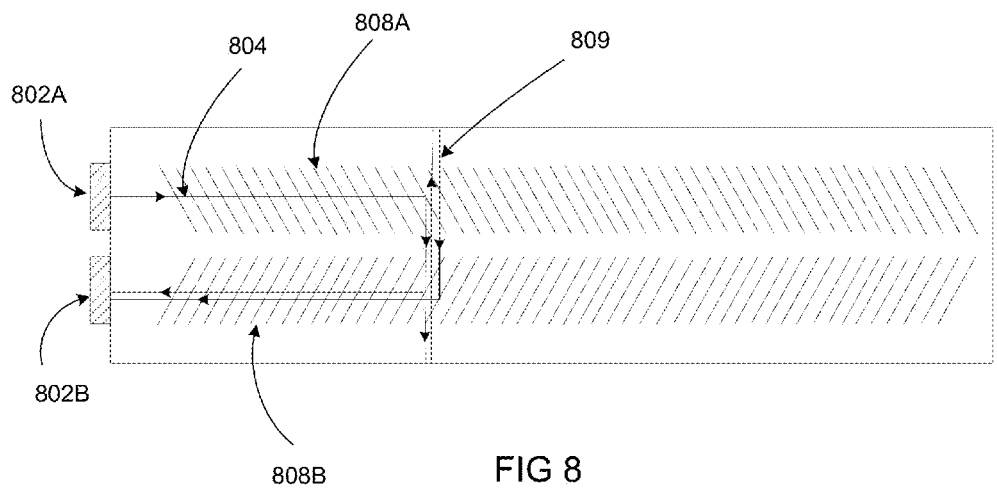
FIG. 8 is an illustration of a sensor having a double-array configuration.
Figure 8B:
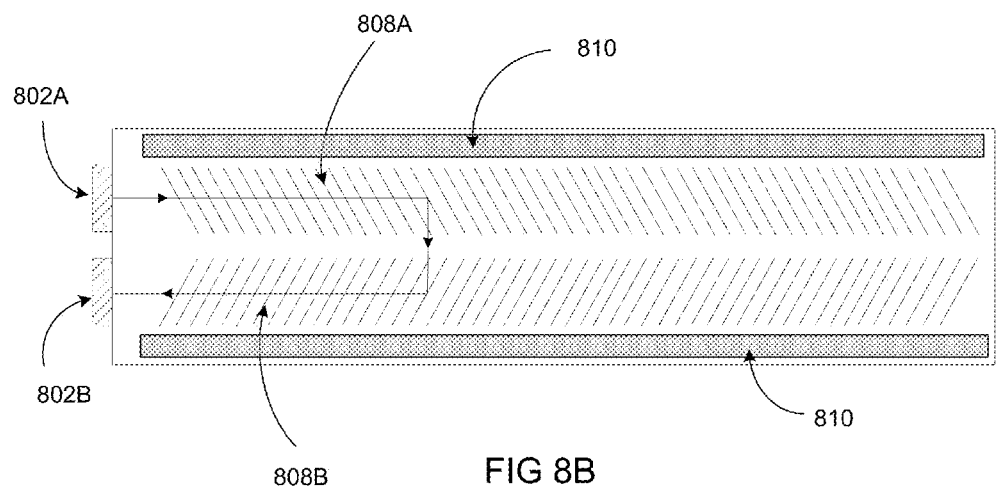

One problem associated with single array narrow strip sensors is spurious multiple reflections. Most of the Lamb mode pulse train that is directed toward and returned from the reflection edge of the substrate passes through the array. The waves then reflect from the opposing edge, and continue to travel back and forth in paths across the array. Each time the wave group traverses the substrate, a portion is reconverted to shear and sent back to the transducer. The result is spurious waves adding to the desired signals emanating from the downstream regions of the array 705, as illustrated in FIG. 7A. Several methods have been found to reduce the effects of these multiple reflections. Materials, such as that indicated at 710, that absorb the Lamb mode can be bonded to the sensor strip at the sensor strip edge as illustrated in FIG. 7B. Further the opposing edges can be machined to form a knife edge 714, which acts to absorb the wave energy as illustrated in FIG. 7C. The strip may also be formed with non-parallel edges, as shown in FIG. 7D. Here the waves enter the array at a non-orthogonal angle with respect to the array axis. This has the effect of reducing the mode conversion efficiency. Another approach, in addition to those previously discussed, is to form two parallel arrays. Referring to FIG. 8, it can be seen that a reflecting edge is not needed (unlike the single array which depends on one reflecting edge). Thus both edges can be coated with absorbing material, as indicated at 812, and shaped to reduce reflections, thereby doubling the reflection reduction efficacy. In addition to the aforementioned reflection reduction embodiments, a further approach is to continuously increase the reflectivity/conversion efficiency of the echelons, with distance from the start of the array.

This is readily accomplished by increasing the echelon depth for a subtractive array, or the height for an additive array. The first to arrive spurious reflections travel approximately twice the array width before they arrives back at the array, or 10 cm for example. These unwanted waves will then arrive when the desired waves that originated 10 centimeters downstream the array also arrive.

In previous array designs, the reflectivity or conversion efficiency of the echelons was adjusted with distance along the array to produce a response with uniform amplitude versus time. Typically the echelon depth changed as discussed previously.

Modifying the depth profile to produce a response that increases with time, reduces the spurious reflection problem somewhat because the spurious reflections are produced at an earlier time than the desired signal, and will have less of an effect than with a uniform array. This is known as back end boost. Taking an etched array design for example, the echelon depth is varied along the array by varying the immersion time in an etching solution in a controlled manner. A full analysis of the array employs what is known as coupled mode theory, and should also include diffraction and substrate absorption energy losses.

In practice, diffraction losses are difficult to calculate and are initially ignored. The coupled mode theory leads to a second order differential equation, that can be solved via Riemann's method, but the result is a very unwieldy computation, if we specify the response versus time and calculate the etch depth profile to achieve this. Because the diffraction effects have been ignored, the resulting etch profile is always a first pass and needs to be modified experimentally. The preferred array etch profile design approach is to assume that the in-plane shear mode couples to the Lamb mode, but does not include Lamb to shear coupling, as would be the case with coupled mode theory.

The response is specified to be exponentially increasing along the array with distance according to the equation:

$$A_r(x) = A_r(o) \cdot \exp(\beta/2 \cdot x) \tag{Eq. 2}$$

The result is a first order differential equation that can be readily solved, by the Laplace Transform method to, for example, give etch depth versus distance for a specified value of beta according to the following equation:

$$d(x) = ((c)(\alpha+\beta)^{1/2})/((1+(A_I/A_R)^2(w)(\alpha+\beta))(e^{-(\alpha+\beta)x})-1)^{1/2} \tag{Eq. 3}$$

where:
d(x) is the echelon etch depth;
c is an experimentally determined constant relating depth to the coupling factor;
$\alpha$ is the substrate energy loss per unit length;
$\beta$ is the amplitude rise versus distance constant;
w is the width of the array;
$A_I$ is the initial pulse train amplitude;
$A_R$ is the initial amplitude from the array; and
x is the distance along the array.

The design procedure is as follows:
  i) determine the absorption losses and the coupling versus etch depth factor experimentally and substitute these in the equation;
  ii) decide on a maximum etch depth, and a minimum initial signal amplitude from which beta can be determined and substituted; and
  iii) determine the etch depth versus distance.

The etch time versus distance can now be determined assuming the etch rate is known. This etch profile is a first pass, and is typically repeated based on the response from the previous profile. As noted previously, a level sensor strip can be over 6 feet long. A desirable thickness is 1 millimeter or less, with a width of less than 5 centimeters. The strip is therefore prone to bending and vibrations.

Figure 9A:
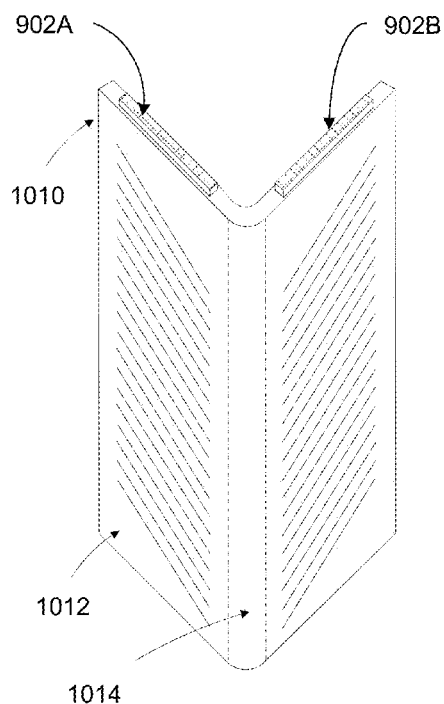
FIG. 9A shows a sensor having a creased substrate.
Figure 9B:
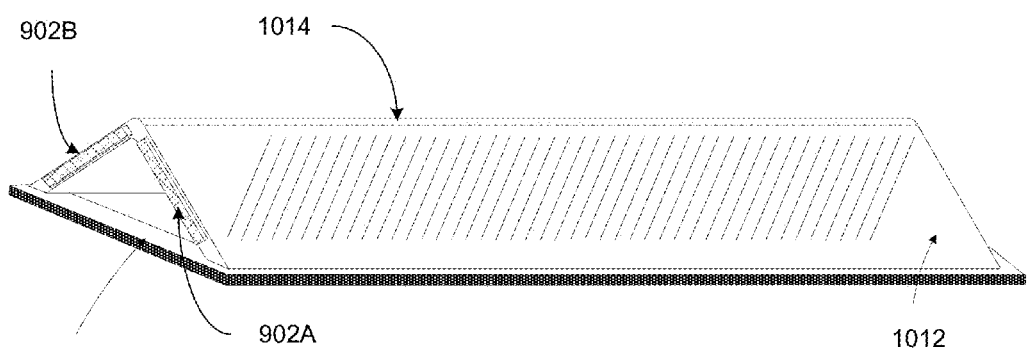
FIG. 9B illustrates the sensor of FIG. 9A supported in a housing or cradle.

FIG. 9A illustrates a sensor 1010 configuration that has been shown to considerably increase the stiffness of the strip 1012. When the strip 1012 is bent with the bending crease 1014 parallel to the array, for example between the arrays for the double-array version, the stiffness increases considerably. As long as the radius of curvature of the crease 1014 is greater than several wavelengths, 3 to 4 mm for example, the crease is essentially transparent to the first order antisymmetric Lamb mode. The strip can then be mounted in a cradle 1012 as shown in FIG. 9B for additional strength and stiffness.

Figure 10:
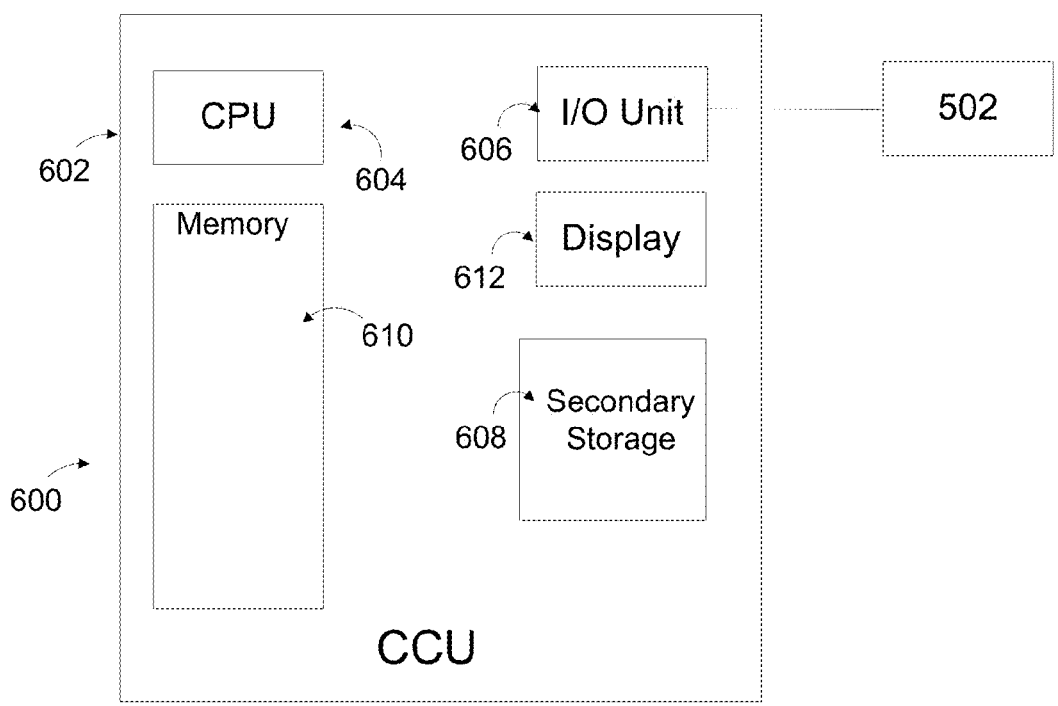
FIG. 10 shows one control panel for monitoring and controlling the level sensor.

FIG. 10 illustrates one embodiment of a control panel 600 used to monitor and control the sensor 500. The control panel 600 includes a central control unit 602 that is electrically coupled to the shear wave transducer 502. The central control unit 602 (CCU) includes a central processing unit (CPU) 604, an input output (I/O) unit 606, a secondary storage device 608, and a memory 610. The central control unit 602 may also include a digital display 612. Central control unit 602 may further comprise standard input devices such as a keyboard, a mouse, a digitizer, or a speech processing means (each not illustrated). The I/O unit 606 may further include a plurality of analog outputs that provides a variable voltage or current to the shear wave transducer 502. The I/O unit 606 also includes a plurality of inputs that are electrically coupled to sensors, and which monitor the pulse train and other environmental conditions.

The control panel 600 transmits a signal to the shear wave transducer 502 to generate different waveforms based on a desired measurement. To determine a level of a fluid in which the sensor 500 is immersed, the control panel 600 transmits a signal, via the I/O unit 606, to the wave transducer 502 to produce a zeroth order shear wave burst 504. A pulse train sensor coupled to the I/O unit 606 of the control panel 600 captures and stores the reflected pulse train in the memory 610. Software operating in the CPU 604 analyzes the returning pulse train to determine the point at which the amplitude of the pulse train drops below a predetermined threshold and the corresponding time elapsed before this drop in amplitude occurs. The point at which the amplitude of the pulse train drops suddenly indicates the point where the level sensor 500 is immersed in the fluid. Because each echelon 108 is separated from adjacent echelons 108 by the same distance $d_{108}$ and from the reflective side surfaces 110, 112 and the reflective end surface 114 by the same distance $d_{112}$, and since the velocity of the waves is known, the distance from the transducer 502 to the top of the fluid can be determined. When this distance is subtracted from the total length of the sensor, the depth of the fluid is determined.

To determine the density of the fluid in which the sensor 500 is immersed, the control panel 600 transmits a signal to the transducer 502 to produce a slow torsional mode wave. In response, the transducer 502 produces a slow torsional mode wave at a frequency lower than the shear resonance of the sensor 500 to ensure that the slow torsional mode wave operates in a non-dispersive mode. The pulse train sensor then captures the reflected pulse train and the software operating in the CPU 604 determines the time elapsed from the generation of the slow torsional mode wave by the transducer 502 until a reflection is received from the reflective end surface 114. The total time required for the slow torsional mode wave to travel to the reflective end surface 114 and reflect back to the transducer 502 is a function of the length of the immersed portion of the sensor 500, the temperature of the fluid, and the density of the fluid. Accordingly, the density of the fluid can be determined by monitoring the temperature of the fluid using a temperature sensor coupled to the I/O unit 606 of the control panel 600 and calculating the length of the immersed portion of the sensor 500, as previously discussed.

In an embodiment, the sensor 500 includes two shear mode generators 502 in a tapered cylinder lead section that are bonded to the substrate 104. The taper reduces the acoustic reflection from the portion of the strip located where the strip initially enters the fluid.

Figure 11:
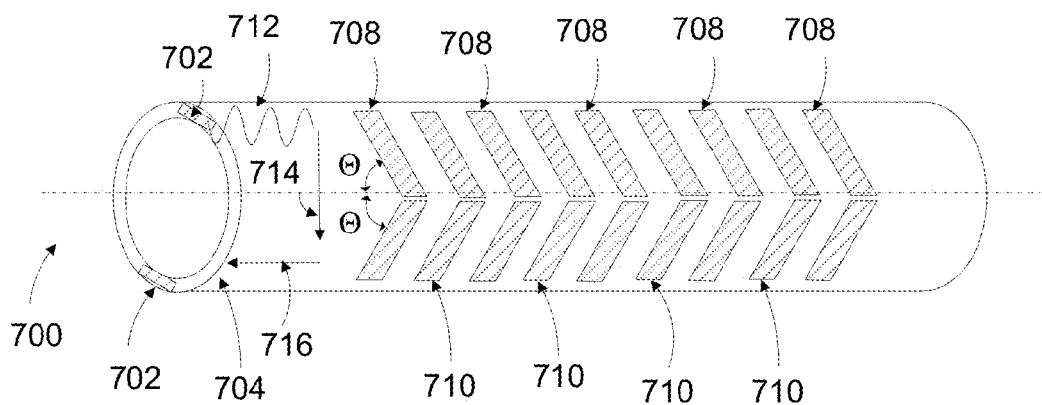
FIG. 11 is an alternate embodiment of the level sensor formed as a cylinder.

FIG. 11 illustrates a cylindrical level sensor 700 that includes at least two shear wave transducers 702 mounted to one end of a hollow cylinder 704 with a plurality of first echelons 708 and a plurality of second echelons 710 mounted on the inner surface of the hollow cylinder 704. The first echelons 708 and second echelons 710 are positioned on an inner surface of the hollow cylinder 704 such that one end of each first echelon 708 is in contact with one end of a corresponding second echelon 710. Each echelon 708 and 710 is angled from the centerline of the cylinder 704 by an angle $\Theta$, as previously discussed.

The transducers 702 are configured to produce a zeroth order shear wave burst 712 that travels along the inner surface of the cylinder 704. When the wave reaches a first echelon 708 or second echelon 710, the wave is converted into an anti-symmetric, first order Lamb flexural wave 714 and is directed toward the corresponding second echelon 710 or first echelon 708, which converts the wave to a zeroth order shear wave 716 that is directed back toward one of the transducers 702. The determination of level and density of the fluid is then carried out using the previously discussed methods.

In this embodiment, the hollow cylinder 704 is a tube with echelons 708, 710 formed on the inner surface of the tube. A cap (not shown) can be positioned on both open ends of the cylinder 104 to seal the cylinder 704. The transducers 702 can be mounted externally of the cylinder to allow for the transducers to be accessible while the hollow cylinder 704 remains sealed, while the fluid level in the cylinder is monitored.

Figure 12A:
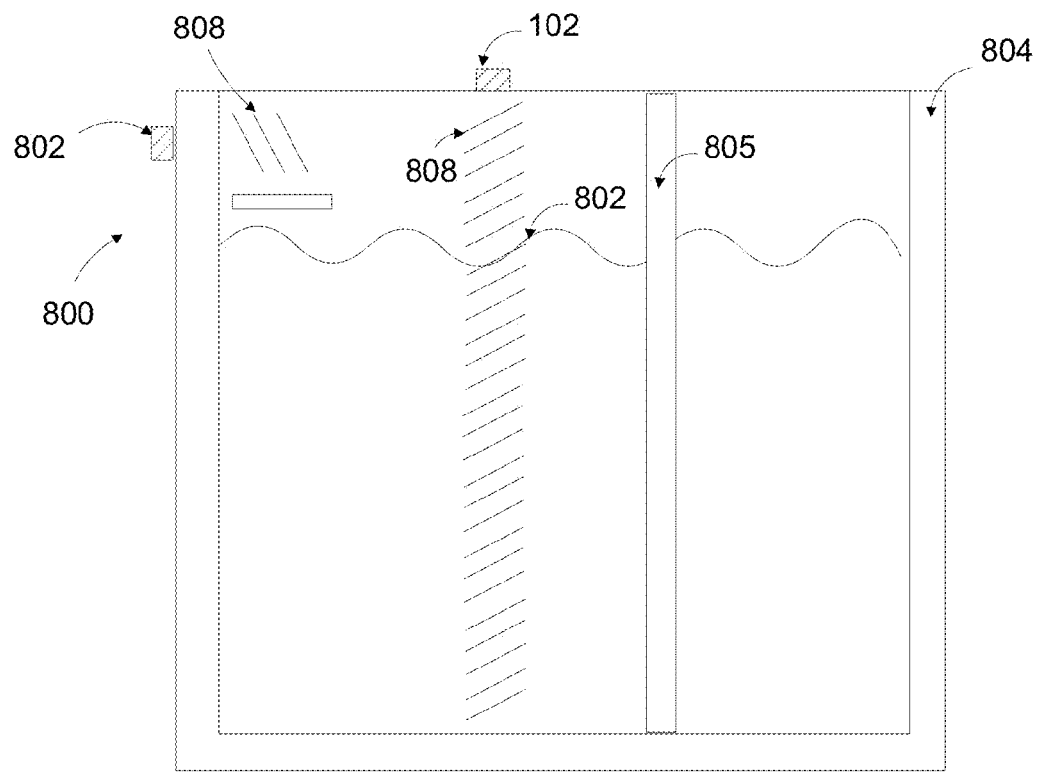
FIG. 12A is a side view of a tank including a level sensor incorporated into the sidewall of the tank.

FIG. 12A is a side view of a tank 800 filled to a level L. A surface 804 of the tank 800 includes a plurality of echelons 808 formed directly on, or into, the surface 804 of the tank 800 with a reflective strip 805 formed on, or into, the surface of the tank 800 that is positioned on one side of the echelons 808. A transducer 802 is mounted on the end of the tank 800 such that the transducer 802 transmits a wave along the surface of the tank 804 using any of the methods previously discussed. The tank 800 can also be substantially cylindrical in shape, in which case, the echelons 808 can be arranged in the same manner as that of the embodiment illustrated in FIG. 11. The tank 800 may also be substantially rectangular or square in shape.

The arrays of echelons 808 can also be etched in multiple surfaces of the tank 800, with each echelon 808 array having separate transducers 802 that are connected to at least one control panel 600. The control panel 600 may receive and analyze a level indication from each echelon 808 array to determine an average level across the surface of the fluid.

The echelons 808 may also be positioned above the fluid L level at a predetermined position 806. In this configuration, the transducer 802 sends a signal along the side surface of the tank 800. When the fluid level 802 rises to the same position 806 as the echelons 808, the pulse train received by the transducer 802 includes a point where the amplitude drops, indicating that the fluid F level has reached at least one echelon 808.

Figure 12B:
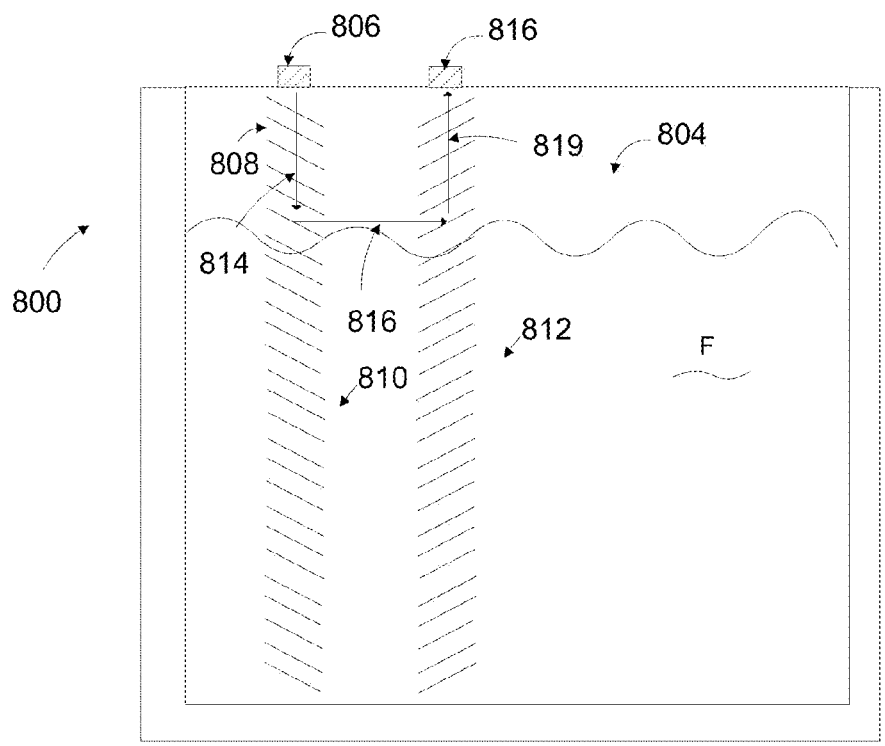
FIG. 12B illustrates a tank having two parallel arrays of echelons formed on an exterior surface of the tank.

FIG. 12B illustrates a tank 800 having at least two parallel arrays 810, 812 of echelons 808 formed on an exterior surface of the tank 800. A transducer 806 is positioned above the first array 810 such that a wave 814 is transmitted down the length of the first array 810 toward the top of the fluid L. A receiver 816 is positioned above the second array 812 such that a wave 818 directed from an echelon 808 in the first array 810 is directed to a corresponding echelon 808 in the second array 812, which directs the wave, as wave 819, toward the receiver 816. The receiver 816 generates a pulse train from wave 819 received from the second array 812. The pulse train may be used to determine the distance to the liquid level L using any of the methods discussed previously. Each of the echelons 808 in the first or second array 810, 812 may convert or reflect waves using any of the methods previously discussed.

Figure 12C:
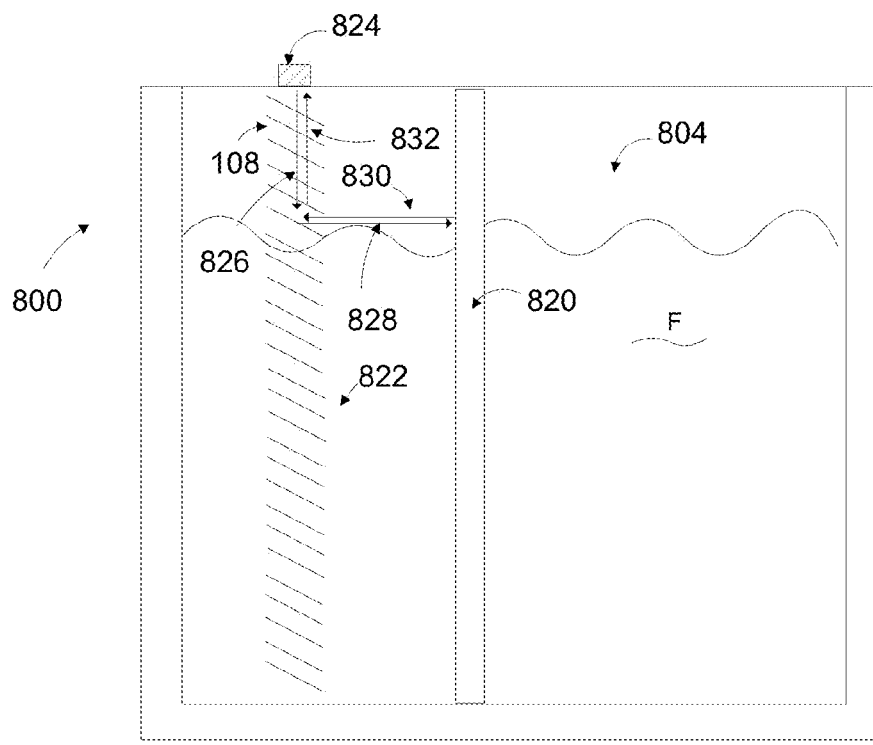
FIG. 12C shows a tank having an array of echelons formed parallel to a reflective strip.

FIG. 12C illustrates a tank 800 having an array 822 of echelons 808 that direct a wave toward a reflective strip 820 formed on the exterior surface of the tank 800. The reflective strip 820 is positioned parallel to the array 822, with a transducer 824 positioned above the array 822. The transducer 824 produces a wave 826 that is directed along the length of the array 822. The wave 826 is directed, as wave 828, toward the reflective strip 820 as it encounters each echelon 808 in the array 822 using any of the direction, or conversion, methods previously discussed. The reflective surface 820 reflects the wave 830 back to the echelon 808, which directs the wave 832 back to the transducer 824. Each echelon 808 may direct, or convert, the waves using any of the previously discussed methods. The transducer 824 generates a pulse train based on the waves that are directed back to the transducer 824, using any of the methods previously discussed. The echelons 808 may be placed on the exterior of the tank 800. Alternately, the echelons 808 can be placed on the interior of the tank.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A liquid level sensor, comprising:
    a substrate having at least one reflective side surface;
    at least one wave generator on one end of the substrate configured to transmit a wave along the surface of the substrate in a first direction; and
    a plurality of reflective echelons positioned on the substrate such that each echelon is at an angle relative to a reflective side surface of the substrate,
    wherein the reflective echelons are configured to convert a wave of a first mode to a wave of a second mode and direct the converted wave toward the reflective surface, and
    wherein the wave of the first mode is the only wave that travels in the first direction,
    and wherein the liquid level sensor is in a shape of a bent strip or a tube.

2. The liquid level sensor of claim 1, wherein the angle is approximately 39.1 degrees.

3. The liquid level sensor of claim 1 wherein the wave transmitted along the surface of the substrate is a shear wave.

4. The liquid level sensor of claim 1 wherein the wave transmitted along an axis of the substrate is a zeroth order shear wave.

5. The liquid level sensor of claim 4 wherein each echelon is configured to convert the zeroth order shear wave into an anti-symmetric, first order Lamb flexural wave.

6. The liquid level sensor of claim 5 wherein the reflective side surface is configured to reflect the Lamb flexural wave back toward the echelon where it is converted to a zeroth order shear wave and directed back toward the wave generator.

7. The liquid level sensor of claim 1 including a reflective end surface on an end of the substrate opposite the wave generator.

8. The liquid level sensor of claim 1 wherein a portion of the substrate is immersed in an aerated fluid.

9. The liquid level sensor of claim 1 wherein the wave generator is configured to transmit a slow torsional mode wave along the length of the substrate.

10. The liquid level sensor of claim 1 wherein the echelons are formed on the surface of the substrate, and the height of each of the plurality of echelons increases along the length of the substrate in a direction away from the wave generator.

11. The liquid level sensor of claim 1 wherein the echelons are formed by etching the surface of the substrate, and the depth the substrate is etched increases along the length of the substrate in a direction away from the wave generator.

12. The liquid level sensor of claim 1 wherein the at least one wave generator is a transducer.

13. The liquid level sensor of claim 12 wherein the transducer is configured to transmit a shear wave.

14. The liquid level sensor of claim 1 wherein the angle is a 45 degree angle.

15. A method of determining the level of a fluid, the method containing the steps of:
    transmitting a first wave operating in a first mode in a first direction along a surface of a substrate by at least one wave generator coupled to the substrate, the substrate having a shape of a bent strip or a tube;
    converting a portion of the wave from a first mode to a second mode when the wave reaches each of a plurality of echelons on the substrate;
    directing the converted wave off each of the plurality of echelons toward a portion of a reflective side surface of the substrate;
    reflecting the converted wave from the reflective side surface toward each of the plurality of echelons;
    converting the wave reflected from the side surface from a second mode back to a first mode; and
    directing the converted first mode wave back toward the wave generator,
    wherein the wave operating in the first mode is the only wave that travels in the first direction.

16. The method of claim 15 wherein the angle is approximately 39.1 degrees.

17. The method of claim 15 wherein the wave transmitted along the surface of the substrate is a shear wave.

18. The method of claim 15 wherein the wave transmitted along the surface of the substrate is a zeroth order shear wave.

19. The method of claim 18 wherein each echelon is configured to convert the zeroth order shear wave into an anti-symmetric, first order Lamb flexural.

20. The method of claim 19 wherein the reflective side surface is configured to reflect the Lamb flexural wave back toward the echelon where it is converted to a zeroth order shear wave by the echelon.

21. The method of claim 15 including the step of reflecting the wave from an end of the substrate opposite the wave generator back toward the wave generator.

22. The method of claim 15 wherein a portion of the substrate is immersed in an aerated fluid.

23. The method of claim 15 including the step of transmitting a slow torsional mode wave along the length of the substrate.

24. The method of claim 15 wherein the echelons are formed on the surface of the substrate, and the height of each of the plurality of echelons increases along the length of the substrate in a direction away from the wave generator.

25. The method of claim 15 wherein the echelons are formed by etching the surface of the substrate, and the depth the substrate is etched increases along the length of the substrate in a direction away from the wave generator.

26. A liquid level sensor including:
a substrate having at least one reflective side surface, the substrate having a shape of a bent strip or a tube;
at least one wave generator on one end of the substrate configured to transmit a wave along the surface of the substrate in a first direction; and
a plurality of reflective echelons positioned on the substrate such that each echelon is at an angle relative to a reflective side surface of the substrate,
wherein the reflective echelons are configured to direct a wave toward the reflective side surface and to direct a wave reflected from the reflective side surface back to the wave generator in a second direction opposite to the first direction, and
wherein waves travelling in the first and second directions are waves of a first mode and waves directed to and reflected from the reflective side surface are waves of a second mode, and the waves of the first mode are the only waves that travel in the first and second directions.

27. A tank including:
a liquid level sensor having at least one wave generator on a top surface of the tank that is configured to transmit a wave along a surface of a substrate in a first direction, the substrate having a shape of a bent strip or a tube; and
a plurality of echelons formed on a first surface of the tank such that each echelon is at an angle relative to a reflective side surface of the tank,
wherein the reflective echelons are configured to direct a wave toward the reflective side surface and to direct a wave reflected from the reflective side surface back to the wave generator in a second direction opposite to the first direction, and
wherein waves travelling in the first and second directions are of waves of a first mode and waves directed to and reflected from the reflective side surface are waves of a second mode, and the waves of the first mode are the only waves travel in the first and second directions.

28. A liquid level reflective array including:
a substrate, having at least two reflective side surfaces, the substrate having the shape of a bent strip or a tube;
a plurality of echelons each arranged along a centerline of the substrate, with each echelon being tilted in relation to the centerline by an angle;
a transducer positioned on an end of the substrate opposite a reflective side surface, the transducer configured to transmit an acoustic wave of a first mode along the substrate in a first direction, and the wave of the first mode is the only wave that travels in the first direction.

29. The liquid level reflective array of claim 28, wherein the angle is sufficient to convert a zeroth order shear wave in to an anti-symmetric, first order Lamb mode.

* * * * *